United States Patent
Caldwell et al.

(10) Patent No.: US 12,428,058 B2
(45) Date of Patent: Sep. 30, 2025

(54) CONTROLLER AND METHOD FOR GENERATION OF STEERING OVERLAY SIGNAL

(71) Applicant: JAGUAR LAND ROVER LIMITED, Coventry (GB)

(72) Inventors: Robyn Caldwell, Coventry (GB); Denis Fusconi, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 218 days.

(21) Appl. No.: 18/044,532

(22) PCT Filed: Sep. 9, 2021

(86) PCT No.: PCT/EP2021/074836
§ 371 (c)(1),
(2) Date: Mar. 8, 2023

(87) PCT Pub. No.: WO2022/053566
PCT Pub. Date: Mar. 17, 2022

(65) Prior Publication Data
US 2023/0399049 A1    Dec. 14, 2023

(30) Foreign Application Priority Data

Sep. 9, 2020 (GB) ..................... 2014163

(51) Int. Cl.
*B62D 15/02* (2006.01)
*B60W 30/12* (2020.01)
(Continued)

(52) U.S. Cl.
CPC .......... *B62D 15/025* (2013.01); *B60W 30/12* (2013.01); *B60W 50/10* (2013.01); *B62D 6/08* (2013.01);
(Continued)

(58) Field of Classification Search
CPC ....... B62D 15/025; B62D 6/08; B60W 30/12; B60W 50/10; B60W 2050/0088; B60W 2540/18; B60W 2710/202
See application file for complete search history.

(56) References Cited

U.S. PATENT DOCUMENTS

2004/0262063 A1    12/2004    Kaufmann et al.
2013/0124047 A1*   5/2013    Lazic .................. B62D 15/025
                                                                701/42
(Continued)

FOREIGN PATENT DOCUMENTS

DE      102005003178 A1    7/2006
GB          2512317 A      10/2014
JP        2015205558 A     11/2015

OTHER PUBLICATIONS

Great Britain Intellectual Property Office, Combined Search and Examination Report under Sections 17 and 18(3) Issued in Application No. GB2014163.6, Jul. 28, 2021, 6 pages.
(Continued)

*Primary Examiner* — Andrew J Cromer
(74) *Attorney, Agent, or Firm* — McCoy Russell LLP (57) ABSTRACT

Aspects of the disclosure relate to a control system and a method for controlling generation of a steering wheel overlay signal to control positioning of a host vehicle. The control system comprises one or more controllers. The control system is configured to generate a steering wheel overlay signal for steering the host vehicle toward a target lane position; receive a driver intervention signal indicative of a driver intervention torque applied to a steering wheel of the host vehicle; and determine a driver intervention torque threshold based at least in part on an elapsed time since the generation of the steering wheel overlay signal. The control system is configured to mitigate the steering wheel overlay
(Continued)

signal based at least in part on the driver intervention torque exceeding the driver intervention torque threshold.

20 Claims, 7 Drawing Sheets

(51) Int. Cl.
*B60W 50/00* (2006.01)
*B60W 50/10* (2012.01)
*B62D 6/08* (2006.01)

(52) U.S. Cl.
CPC . *B60W 2050/0088* (2013.01); *B60W 2540/18* (2013.01); *B60W 2710/202* (2013.01)

(56) References Cited

U.S. PATENT DOCUMENTS

| | | |
|---|---|---|
| 2013/0197713 A1 | 8/2013 | Yoshihama |
| 2016/0176400 A1 | 6/2016 | Nakano et al. |
| 2018/0370542 A1 | 12/2018 | Braunagel et al. |
| 2020/0023843 A1* | 1/2020 | Van Dan Elzen ....... B62D 6/00 |

OTHER PUBLICATIONS

ISA European Patent Office, International Search Report and Written Opinion Issued in Application No. PCT/EP2021/074836, Dec. 23, 2021, WIPO, 13 pages.

* cited by examiner

CONTROLLER AND METHOD FOR GENERATION OF STEERING OVERLAY SIGNAL

CROSS REFERENCE TO RELATED APPLICATIONS

The present application is a U.S. National Phase of International Application No. PCT/EP2021/074836 entitled "CONTROLLER AND METHOD FOR GENERATION OF STEERING OVERLAY SIGNAL," and filed on Sep. 9, 2021. International Application No. PCT/EP2021/074836 claims priority to Great Britain Patent Application No. 2014163.6 filed on Sep. 9, 2020. The entire contents of each of the above-listed applications are hereby incorporated by reference for all purposes.

TECHNICAL FIELD

The present disclosure relates to the generation of a steering overlay signal. Aspects of the invention relate to a control system for generating a steering overlay signal, to a method for generating a steering overlay signal, to a vehicle, to computer software and a non-transitory computer-readable medium.

BACKGROUND

It is known to provide a vehicle, such as an automobile, with a lane keep assist system. Current lane keep assist systems trigger a steering intervention to bring the driver back to a lane. A driver may override the steering intervention by applying an override torque to the steering wheel. The override torque must be over a high threshold to ensure the driver is attentive, for example a sufficient torque to intentionally change lane. A length of the steering torque intervention may be undesirable to the driver. However, due to the high threshold the system may be unresponsive to the driver's attempts to cut short the steering intervention.

It is an aim of the present invention to address one or more of the disadvantages associated with the prior art.

SUMMARY OF THE INVENTION

Aspects and embodiments of the invention provide a control system, a control system, a vehicle, a method, computer software and a non-transitory computer-readable medium as claimed in the appended claims.

According to an aspect of the present invention there is provided a control system for controlling generation of a steering wheel overlay signal to control positioning of a host vehicle, the control system comprising one or more controller. The control system is configured to: generate a steering wheel overlay signal for steering the host vehicle toward a target lane position; receive a driver intervention signal indicative of a driver intervention torque applied to a steering wheel of the host vehicle; and determine a driver intervention torque threshold in dependence on one or more characteristics of the steering wheel overlay signal. The control system is configured to mitigate the steering wheel overlay signal in dependence on the driver intervention torque exceeding the driver intervention torque threshold. Beneficially, the driver may remove the steering wheel overlay signal by applying sufficient torque to the wheel, thereby reducing driver inconvenience. Furthermore, the torque threshold may be tailored for different aspects of the steering wheel overlay signal.

According to an aspect of the present invention there is provided a control system for controlling generation of a steering wheel overlay signal to control positioning of a host vehicle, the control system comprising one or more controller. The control system is configured to: generate a steering wheel overlay signal for steering the host vehicle toward a target lane position; receive a driver intervention signal indicative of a driver intervention torque applied to a steering wheel of the host vehicle; and determine a driver intervention torque threshold in dependence on an elapsed time since the generation of the steering wheel overlay signal. The control system is configured to mitigate the steering wheel overlay signal in dependence on the driver intervention torque exceeding the driver intervention torque threshold. Beneficially, the driver may remove the steering wheel overlay signal by applying sufficient torque to the wheel, thereby reducing driver inconvenience. Furthermore, the torque threshold may be tailored depending on how long the steering wheel overlay signal has been applied, enabling a reduced threshold to be implemented at particular points at which the driver may more commonly wish to remove the steering wheel overlay signal.

The steering wheel overlay signal may be generated to adjust or control a trajectory of the host vehicle during a steering intervention. At least in certain embodiments, the steering wheel overlay signal may comprise a lane assist steering overlay. The lane assist steering overlay may represent an inter-lane control function. The lane assist steering overlay may be for maintaining the host vehicle in the lane of travel or to return the host vehicle to the lane of travel. At least in certain embodiments, the steering wheel overlay signal may comprise an intra-lane steering signal for steering the vehicle to a desired trajectory and/or position in the lane. The lane keep assist function and the intra-lane steering signal may be performed sequentially. The intra-lane steering signal may be generated after the lane assist steering overlay. Alternatively, the intra-lane steering signal may be generated as a continuation or an extension of the lane assist steering overlay. The control system may be further configured to output the steering wheel overlay signal to a power assist steering system to generate a steering wheel overlay torque.

The driver intervention torque threshold may be determined to be reduced in dependence on the elapsed time increasing. Beneficially, the driver may easily remove the overlay signal by applying a lesser torque, thereby reducing driver inconvenience and providing a smoother transition. Provision of this lowered threshold only at the later stage of the steering intervention mitigates the risk of an accidental override at an early critical stage of the steering intervention when initially returning the vehicle to the lane.

Optionally, mitigating the steering wheel overlay signal may comprise removing the steering wheel overlay signal. Alternatively, mitigating the steering wheel overlay signal may comprise reducing the steering wheel overlay signal to provide a lesser overlay.

The driver intervention signal may comprise a torque component indicative of an amount of torque applied, and a duration component indicative of a duration of the applied torque. The driver intervention torque threshold may comprise a torque value threshold and an applied torque duration threshold. Advantageously in this way, short accidental applications of torque by the driver may be disregarded so as not to erroneously trigger an override.

Optionally, the control system is configured to determine the driver intervention torque threshold in dependence on the elapsed time exceeding a threshold time. The threshold time may be a predetermined threshold. The threshold time may be determined to be a sufficient time for the vehicle to initially return safely to the lane. Optionally, the predetermined threshold is in the order of 300 ms to 1500 ms. Optionally, the predetermined threshold is in the order of 400 ms to 600 ms. For example, the predetermined threshold may be set substantially close to 500 ms. For example, the predetermined threshold may be set substantially close to 550 ms. When the elapsed time exceeds the threshold time, the control system may be configured to reduce the driver intervention torque threshold from a first threshold to a second threshold.

In some embodiments, the control system is configured to reduce the driver intervention torque threshold from the first threshold to the second threshold in dependence on the application of the intra-lane steering signal. That is, the driver intervention torque threshold may be reduced for the intra-lane portion of the steering wheel overlay, after the vehicle has returned to or been maintained in the lane and is being aligned and/or positioned within the lane. Beneficially, as soon as the initial critical portion of the steering intervention concludes, the driver may easily override the remainder of the intervention and take back control.

In some embodiments, reducing the driver intervention torque threshold comprises reducing the torque value threshold from a first value threshold to a second value threshold. The first, higher torque value threshold may be a sufficient torque to make a deliberate lane change. The second, lower torque value threshold may be a sufficient torque to reposition the vehicle within a lane. For example, the first torque value threshold may be substantially 3 Nm, and the second torque value threshold may be substantially 2 Nm.

Additionally, or alternatively, reducing the driver intervention torque threshold comprises reducing the applied torque duration threshold from a first higher torque duration threshold to a second lower torque duration threshold. In this way, in the latter part of the steering intervention the duration for which the driver needs to apply torque to the steering wheel to override the steering intervention is reduced. For example, the first higher torque duration threshold may be substantially close to 500 ms and the second lower torque duration threshold may be substantially close to 100 ms.

In some embodiments, reducing the driver intervention torque threshold comprises reducing both the torque value threshold and the applied torque duration threshold. Advantageously, the vehicle may more quickly respond to a smaller input, allowing the override to feel more natural and responsive to the driver.

Optionally, the control system is configured to determine at least one boundary of a lane of travel; and determine the target lane position for the host vehicle in relation to the at least one boundary. The at least one boundary may comprise a road edge or road markings. Determining the or each boundary of the lane of travel may comprise identifying a road edge or a road marking. The steering wheel overlay signal may be generated in response to the host vehicle crossing or approaching the at least one boundary. The target lane position may be determined to be within the lane a predetermined distance from the at least one boundary. The control system may thus generate the steering wheel overlay signal to steer the host vehicle towards the predetermined distance from the boundary.

Optionally, the control system is configured to: determine a first boundary and a second boundary of the lane of travel, wherein the first boundary and the second boundary are opposing, and control generation of the steering wheel overlay signal to steer the host vehicle towards a mid-point between the first boundary and second boundary. By opposing, it is meant that the first boundary and second boundary are located on each side of the lane of travel respectively. The target lane position may thus be determined to be at the mid-point of the lane of travel.

According to a further aspect of the invention, there is provided a vehicle comprising a control system as described above.

According to another aspect, there is provided a computer-implemented method for controlling generation of a steering wheel overlay signal to control positioning of a host vehicle. The method comprises generating a steering wheel overlay signal for steering the host vehicle toward a target lane position; receiving a driver intervention signal indicative of a driver intervention torque applied to a steering wheel of the host vehicle; determining a driver intervention torque threshold in dependence on an elapsed time since the generation of the steering wheel overlay signal; and mitigating the steering wheel overlay signal in dependence on the driver intervention torque exceeding the driver intervention torque threshold.

According to another aspect, there is provided a non-transitory computer-readable medium having a set of instructions stored therein which, when executed, cause a processor to perform the method above.

According to yet another aspect, there is provided computer software that, when executed, is arranged to perform the method above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A control system 1 in accordance with an embodiment of the present invention will now be described with reference to the accompanying figures. The control system 1 is installed in a vehicle 2, referred to herein as a host vehicle 2. The host vehicle 2 in the present embodiment is an automobile, such as a wheeled vehicle, but it will be understood that the control system 1 may be used in other types of land vehicle. The host vehicle 2 is described herein with reference to a reference frame comprising a longitudinal axis X, a transverse axis Y and a vertical axis Z. The host vehicle 2 has a longitudinal centreline CL extending along the longitudinal axis X.

Figure 1:
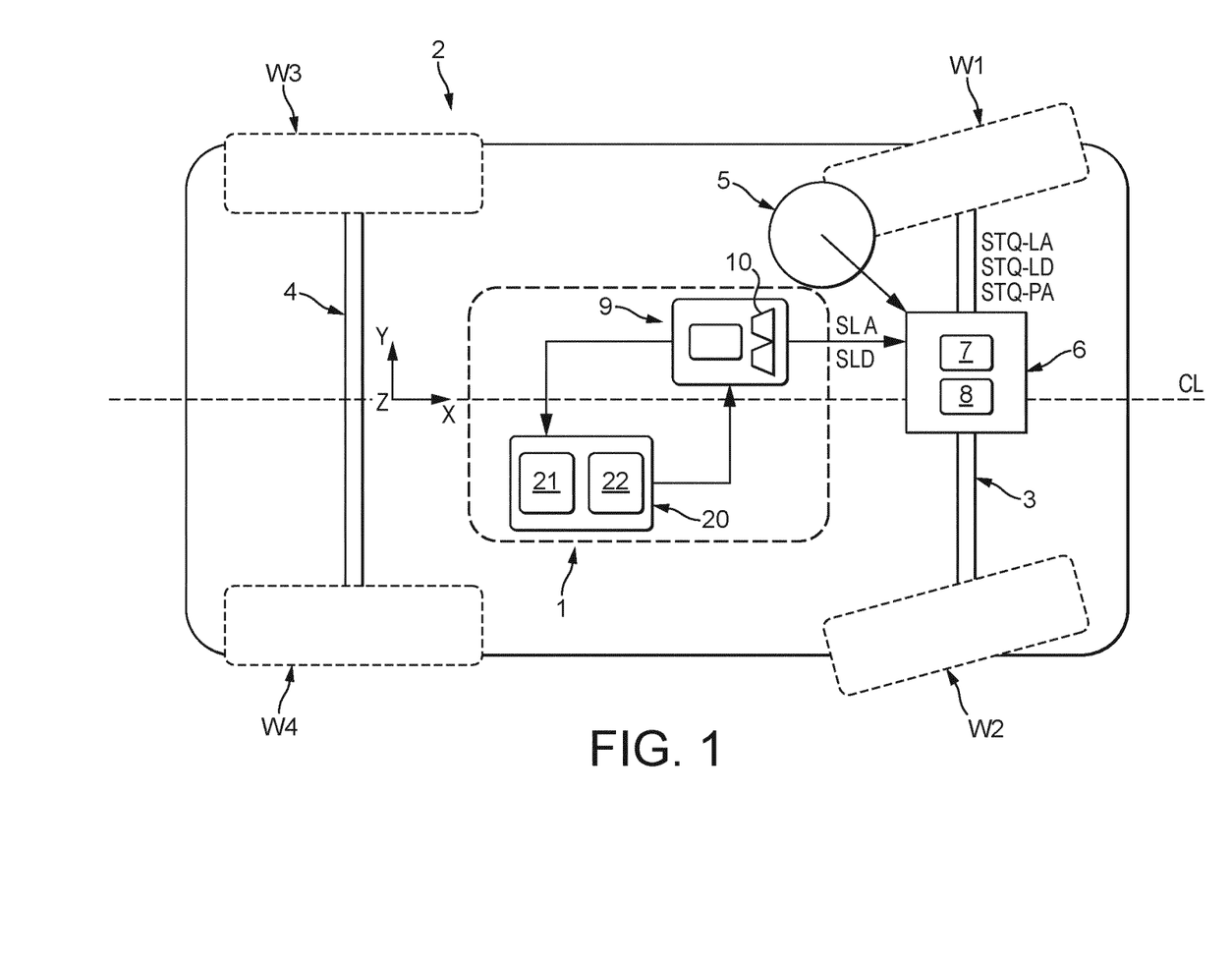
FIG. 1 shows a schematic representation of a host vehicle incorporating a control system in accordance with an embodiment of the present invention.

As illustrated in FIG. 1, the host vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the host vehicle 2. A driver-operated steering wheel 5 is provided for controlling a steering angle α of the first and second wheels W1, W2 is provided on the front axle 3.

A power assist steering system 6 is provided to generate a steering assist torque STQ-PA to supplement a steering torque applied to the steering wheel 5 by the driver. The power assist steering system 6 comprises a power assist steering controller 7; a torque sensor (not shown) for sensing the steering torque applied by the driver to the steering wheel 5; and a power assist steering actuator 8 for generating the steering assist torque STQ-PA. In the present embodiment, the power assist steering system 6 is an electric power assist steering system (EPAS) comprising an electromechanical actuator operable to generate the steering assist torque. Other types of power assist steering actuator 7 may be used, such as a hydraulic actuator.

The control system 1 comprises a lane departure warning system 9 for identifying when the host vehicle 2 is departing the host vehicle lane of travel LT-n (i.e. the current lane in which the host vehicle 2 is travelling). As described herein, the lane departure warning system 9 is also suitable for identifying when the host vehicle 2 is approaching or traversing a physical limit or a boundary of the road R on which the host vehicle 2 is travelling. The physical limit or boundary of the road R is referred to herein as a road edge RE. The lane departure warning system 9 is configured to output a lane departure signal SLD upon determining that the host vehicle 2 is departing or at risk of departing the host-vehicle lane of travel LT-n or approaching or traversing the road edge RE.

The power assist steering system 6 is configured to implement a lane keep assist (LKA) function for maintaining or returning the host vehicle 2 to the lane of travel LT-n. The control system 1 is configured to control the power assist steering system 6 to generate a lane assist steering overlay STQ-LD in dependence on the lane departure signal SLD. The lane assist steering overlay STQ-LD in the present embodiment comprises or consists of a lane assist steering torque STQ-LD. The lane assist steering torque STQ-LD is applied as a steering wheel torque overlay to the steering assist torque STQ-PA generated by the power assist steering system 6. The lane assist steering torque STQ-LD acts to steer the host vehicle 2 to return to the lane of travel LT-n or avoid departing from the lane of travel LT-n.

Further to maintaining or returning the host vehicle 2 in the lane of travel, the control system 1 may be configured to continue the intervention to steer the host vehicle to a target position in the lane of travel LT. The lane departure warning system 9 is configured to output an intra-lane signal SLA comprising a target position and/or target trajectory $\alpha_T$ of the host vehicle 2 in the host-vehicle lane of travel LT. The control system 1 is then configured to control the power assist steering system 6 to generate an intra-lane steering signal STQ-LA in dependence on the intra-lane signal SLD. The intra-lane steering signal STQ-LA in the present embodiment comprises or consists of an intra-lane steering torque STQ-LA. The steering torque request may comprise a torque request direction (+ve or −ve) and optionally also a torque request magnitude.

The lane departure warning system 9 comprises a sensor unit 10 and may comprise an image processing module 11. The sensor unit 10 in the present embodiment comprises an optical camera having a field of view extending forwards in front of the host vehicle 2. The sensor unit 10 may comprise one or more optical cameras, for example a stereo camera. Alternatively, or in addition, the lane departure warning system 9 may utilise other types of sensor, such as a radar system or a LIDAR system, to capture a representation of a region in front of the host vehicle 2. The sensor unit 10 in the present embodiment is located behind a rear-view mirror (not shown) provided at the top of the front windshield. Other mounting locations are possible, for example the sensor unit 10 may be provided behind or in a front grille of the host vehicle 2. The lane departure warning system 9 may optionally receive inputs from one or more vehicle systems, for example to determine if the driver has activated side indicators to signal an intended change the lane of travel LT. The lane departure warning system 9 may be configured to inhibit output of the lane departure signal SLD, for example if the driver activates the directional (side) indicators. The image processing module 11 receives image data captured by the sensor unit 10. The image data is processed to identify features of the road R on which the host vehicle 2 is travelling. The image data is also processed to detect the road edge RE, for example by identifying a transition or boundary between a road surface which may be relatively smooth (for example defined by asphalt, concrete or other surfacing material) and an adjacent surface which may be relatively rough (for example composed of one or more of the following: grass, mud, gravel, sand and snow).

Figure 2:
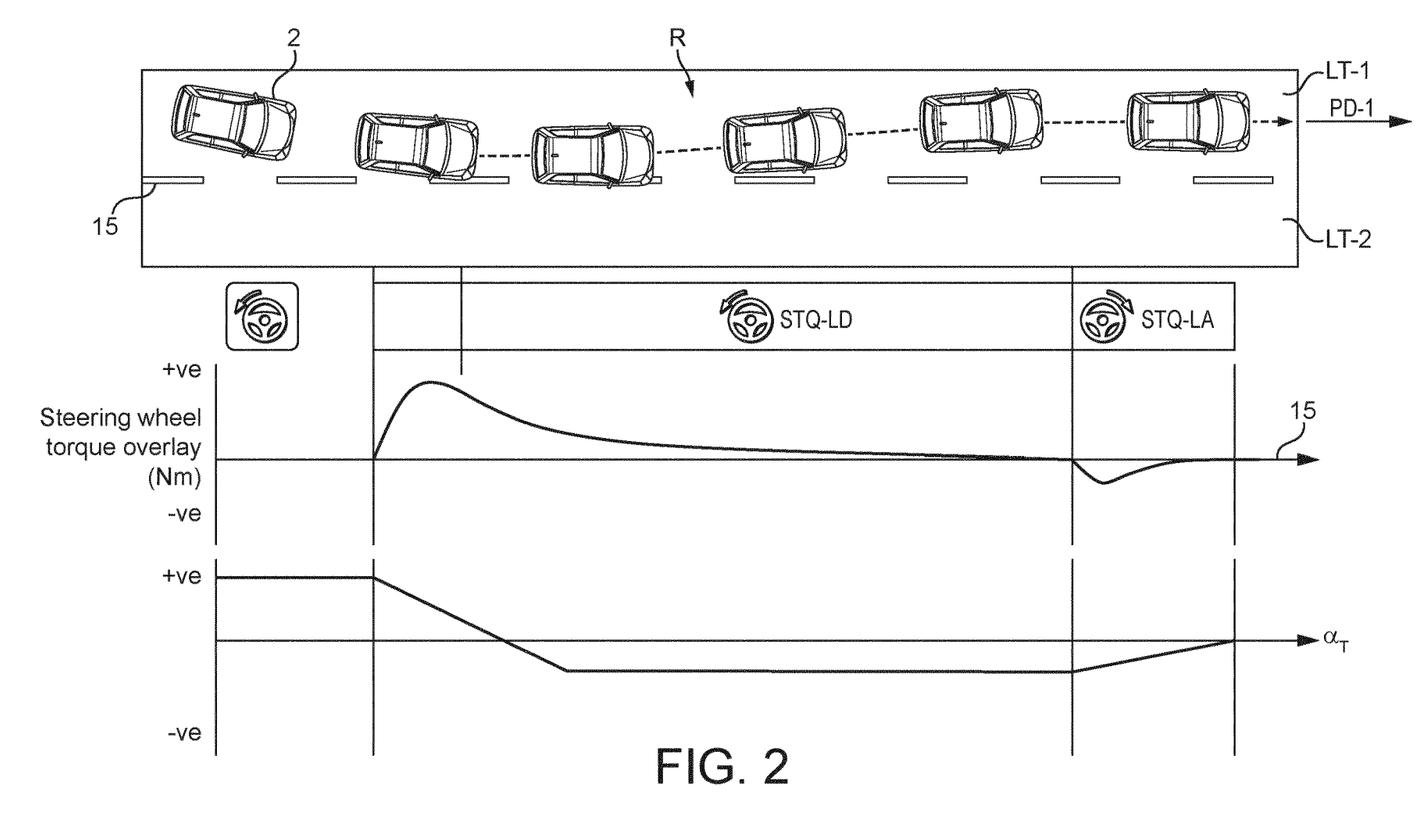
FIG. 2 illustrates generation of a lane keep assist torque and an intra-lane torque by the control system.

As illustrated in FIG. 2, the power assist steering system 6 is operable to implement a steering overlay intervention. The steering overlay intervention comprises a sequence of the lane keep assist function and the intra-lane function.

In use, the power assist steering system 6 may be controlled to generate a lane assist steering torque STQ-LD when the lane departure warning system 9 determines that the host vehicle 2 is departing a lane of travel LT-n. The power assist steering system 6 may then be controlled to generate an intra-lane steering torque STQ-LA to be applied after the lane assist steering torque STQ-LD. The intra-lane steering torque STQ-LA may, for example, be applied in dependence on a determination that the host vehicle 2 has returned to the host-vehicle lane of travel LT-n.

The lane assist steering torque STQ-LD and the intra-lane steering torque STQ-LA are transmitted to the steering wheel 5 to provide a haptic signal to the driver of the host vehicle 2. The lane assist steering torque STQ-LD and the intra-lane steering torque STQ-LA are output to the steering wheel 5 in an appropriate direction to maintain the host vehicle 2 in the host-vehicle lane of travel LT-n. The magnitude of the lane assist steering torque STQ-LD and the intra-lane steering torque STQ-LA are controlled such that, if necessary, the driver can override the lane assist steering torque STQ-LD or the intra-lane steering torque STQ-LA, as will be described. The lane assist steering torque STQ-LD and the intra-lane steering torque STQ-LA may, for example, each have a maximum value of 3 Nm although other maximum values may be selected as appropriate.

Figure 3A:
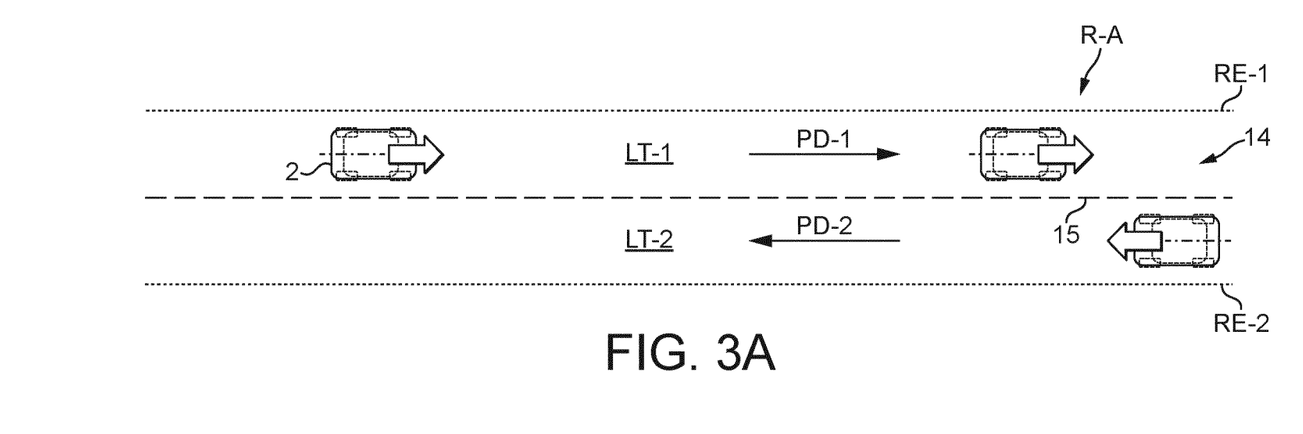
FIG. 3A illustrates the host vehicle travelling on a first section of road having a single lane of travel in each direction.
Figure 3B:
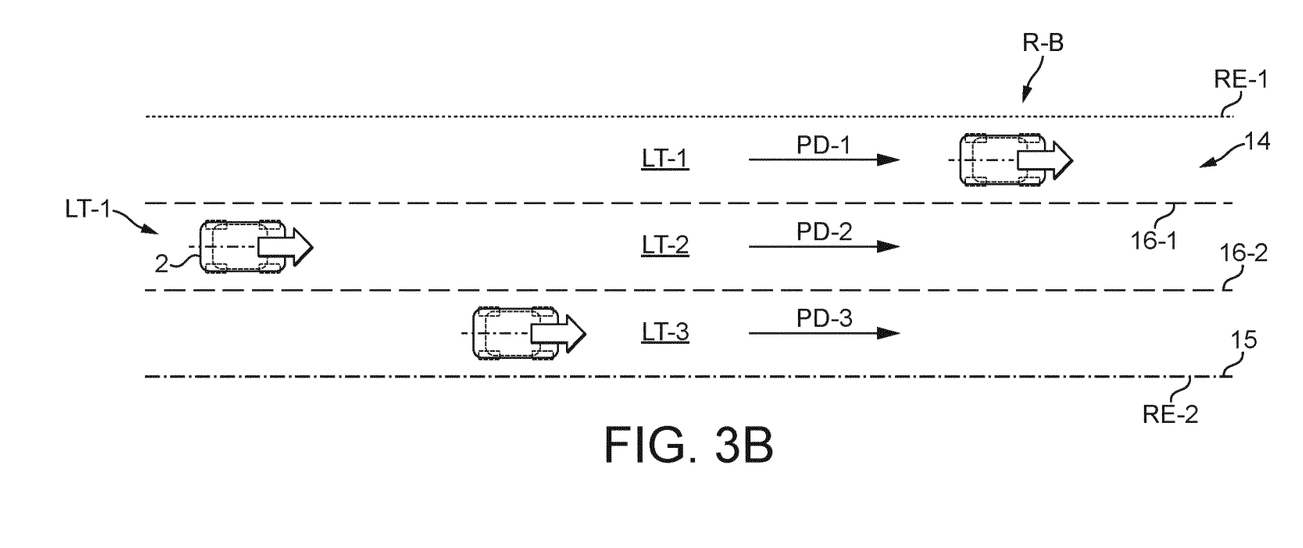
FIG. 3B illustrates the host vehicle travelling on a second section of road having a plurality of lanes of travel in each direction.

The control system 1 can be implemented when the host vehicle 2 is travelling on a road R having one or more lanes of travel LT-n. By way of example, a first road section R-A is shown in FIG. 3A; and a second road section R-B is shown in FIG. 3B.

The first and second road sections R-A, R-B can form part of the same road R or may be separate roads R. The first road section R-A is a two-lane road (also known as a "two-lane highway") having first and second lanes of travel LT-1, LT-2 for vehicles travelling in respective first and second directions. The second road section R-B consists of a multiple-lane road (also known as a "multiple-lane highway") having a two or more lane of travel LT-n for vehicles travelling in the same direction. It will be understood that the present invention is not limited to operation on roads having the features illustrated in the first and second road sections R-A, R-B. The first and second road sections R-A, R-B each comprise first and second road edges RE-1, RE-2. In the illustrated example, the first and second road edges RE-1, RE-2 mark the lateral extent of the metalled road surface. It will be understood that one or both of the first and second road edges RE-1, RE-2 may comprise a barrier or partition member, for example separating lanes of a dual carriageway (also known as a "divided highway"). The first and second road sections R-A, R-B may also comprise road markings (denoted herein generally by the reference numeral 14). The first road section R-A has road markings 14 comprising a central road marking 15. As shown in FIG. 3B, the central road marking 15 comprises a centre line of the second road section R-B. The road markings 14 on the second road section R-B comprise one or more lane markings 16-$n$ representing a boundary of a lane of travel LT-n for vehicles travelling in the same direction or in opposite directions. The one or more lane markings 16-$n$ may comprise lane lines. In the illustrated arrangement, the second road section R-B comprises first and second lane markings 16-1, 16-2 for demarcating first, second and third lanes of travel LT-1, LT-2, LT-3. The central road marking 15 and/or the one or more lane marking(s) 16-$n$ may each comprise a continuous line (not shown) or an interrupted line (shown in FIGS. 3A and 3B). The road marking(s) 14 may each comprise one line or multiple lines, for example in the form of a single line or a double line. The central road marking 15 typically differentiates between sections of the first or second road section R-A, R-B intended for travel in opposite directions. Alternatively, or in addition, the road marking(s) 14 may comprise edge lines to indicate an edge of an inboard lane; the edge lines may be separated from the associated first or second road edge RE-1, RE-2. The first road section R-A shown in FIG. 3A includes central road markings 15 and lane markings defining a plurality of lanes of travel LT-n.

The lane departure warning system 9 is operable to monitor the image data captured by the sensor unit 10 at least substantially in real time. The image processing module 11 analyses the image data to identify the first road edge RE-1 and/or the second road edge RE-2. The image processing module 11 may, for example, identify changes in the contrast and/or colour of the image data which may be indicative of the first and/or second road edge RE-1, RE-2. Other image processing techniques may be used to identify the first and second road edges RE-1, RE-2. The image processing module 11 is configured also to identify any road markings 14 present on the road R. The image processing module 11 may, for example, utilise image processing techniques to identify continuous or interrupted lines extending in a forward direction (i.e. parallel to the centre line CL of the host vehicle 2). The image processing module 11 is configured to identify the central road markings 15 and the lane markings 16. If road markings 14 are identified, the image processing module 11 identifies the lane of travel LT-n in which the host vehicle 2 is currently travelling (referred to herein as the host-vehicle lane of travel LT-n).

The image processing module 11 is configured to determine a principal axis PD of the lane of travel LT-n in which the host vehicle 2 is currently travelling. The principal axis PD represents a principal direction of travel for vehicles travelling in the lane of travel LT-n. The principal axis PD may be determined in dependence on one or more of the following: the first road edge RE-1, the second road edge RE-2, and the road marking(s) 14. The principal axis PD may, for example, be identified as a direction extending substantially parallel to the road edge RE-n, a central road marking 15 or a lane marking 16. The principal axis PD may be identified as a direction extending substantially parallel to a boundary of the lane of the travel LT-n which is closest to the host vehicle 2, for example closest to the centre line CL of the host vehicle 2). Alternatively, or in addition, the principal axis PD may be determined with reference to two or more features identified in the image data. For example, the principal axis PD may be determined as corresponding to a virtual centreline extending between a first road edge RE-1 and a central road marking 15; or a virtual centreline extending between first and second lane markings 16-1, 16-2. Alternatively, the principal axis PD may be offset from and extend parallel to a virtual centreline of the road R or the lane of travel LT-n. The image processing module 11 may optionally determine a centreline of the or each lane of travel LT-n. Alternatively, or in addition, the principal axis PD may be predefined, for example in map data.

The lane departure warning system 9 identifies the road marking 14 or road edge RE-1, RE-2 closest to the longitudinal centreline CL of the host vehicle 2. If the host vehicle 2 approaches or crosses the identified road marking 14 or road edge RE-1, RE-2, the lane departure warning system 9 determines that the host vehicle 2 is departing from the host-vehicle lane of travel LT-n. The lane departure warning system 9 then outputs the lane departure signal SLD. The lane departure signal SLD includes an indication of whether the host vehicle 2 is traversing the lane markings or road edge on a right-hand side or a left-hand side of the host vehicle 2. The power assist steering system 6 receives the lane departure signal SLD and is operable to generate the lane assist steering torque STQ-LD in a direction suitable for maintaining the host vehicle 2 in the host-vehicle lane of travel LT-n.

Following application of the lane assist steering torque STQ-LD, the lane departure warning system 9 may output the intra-lane signal SLA. The power assist steering system 6 may then be controlled to generate the intra-lane steering torque STQ-LA to control the host vehicle 2 to a target position within the lane of travel LT-n (i.e. at a target lane position).

The intra-lane steering torque STQ-LA can be generated as a separate control function which is implemented upon completion of the lane assist steering torque STQ-LD, for example as a continuation of this function. In a variant, the intra-lane steering torque STQ-LA may be integrated into the lane assist steering torque STQ-LD.

The intra-lane steering torque STQ-LA may be generated to position the host vehicle 2 at least a predetermined distance D1 from a boundary of the lane of travel LT-n. The predetermined distance D1 may be defined relative to the centreline CL of the host vehicle 2 or relative to the side of the host vehicle 2 closest to the identified boundary. The boundary may, for example, correspond to the first or second road edge RE-1, RE-2 or a road marking 14. By way of example, the predetermined distance D1 is shown in relation to a first road edge RE-1 in the scenario illustrated in FIG. 4. Alternatively, the control system 1 may generate the intra-lane steering torque STQ-LA to position the host vehicle 2 centrally within the lane of travel LT-n. The intra-lane steering torque STQ-LA may be configured to position the host vehicle 2 at a mid-point between the first and second lane markings 16-1, 16-2 which define opposing sides of the lane of travel LT-n.

Figure 4:
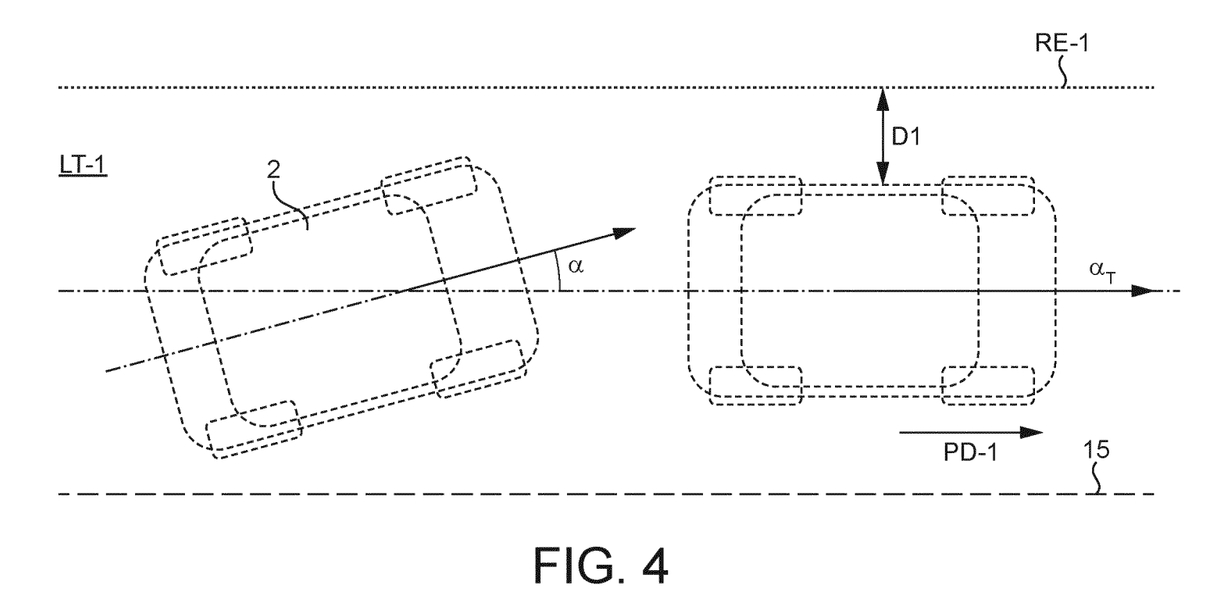
FIG. 4 illustrates the position and trajectory of the target vehicle in a lane of travel.

At least in certain embodiments, this may facilitate the transition to the scenario in which the host vehicle 2 is controlled exclusively by the driver. The intra-lane function is implemented by a steering wheel torque overlay comprising an intra-lane steering torque STQ-LA applied to the steering assist torque STQ-PA. In the arrangement illustrated in FIG. 2, the control system 1 is configured to generate the intra-lane steering torque STQ-LA following application of the lane assist steering torque STQ-LD. The intra-lane steering torque STQ-LA is generated to control the host vehicle 2 at least substantially to position the host vehicle 2 at a predefined position within the lane of travel LT-n. In the present embodiment, the intra-lane steering torque STQ-LA is also generated to control the host vehicle 2 at least substantially to align a trajectory α (or orientation) of the host vehicle 2 with a target trajectory $\alpha_T$. A target position and a target orientation for the host vehicle 2 are represented in FIG. 4 by a dashed (phantom) representation of the host vehicle 2. The target trajectory $\alpha_T$ in the present embodiment is substantially parallel to the principal axis PD of the lane of travel LT-n. The intra-lane steering torque STQ-LA is transmitted to the steering wheel 5 and provides a haptic signal to the driver. The intra-lane steering torque STQ-LA is output to the steering wheel 5 in an appropriate direction to control the trajectory α of the host vehicle 2 at least substantially to match the target trajectory α T. The intra-lane steering torque STQ-LA is generated in dependence on a comparison of a current trajectory α of the host vehicle 2 in relation to the principal axis PD.

To facilitate the transition to the host vehicle 2 being controlled by the driver, the control system 1 is configured to reduce or remove the magnitude of the intra-lane steering torque STQ-LA such that the steering wheel overlay is eventually removed. The condition for removal of the intra-lane steering torque STQ-LA may be such that the trajectory of the host vehicle is substantially close to the target trajectory $\alpha_T$, the position of the host vehicle is substantially close to the target position, or a lateral velocity of the vehicle is below a threshold such that the host vehicle is travelling substantially parallel in the lane of travel.

The driver may desire to end the steering intervention before completion, for example to intentionally change lanes or reposition the vehicle. It may be burdensome for the driver to wait for the steering intervention to be completed. The control system 1 is configured to remove the steering wheel overlay signal responsive to an active driver override, causing the power assist steering system 6 to remove or reduce the intra-lane steering torque STQ-LA or the lane assist steering torque STQ-LD.

To implement an active driver override, a driver may apply a driver intervention torque to the steering wheel 5. The control system 1 is configured to receive from the steering wheel 5 a driver intervention signal 540 indicative of the torque applied to the steering wheel 5 by the driver.

Figure 5A:
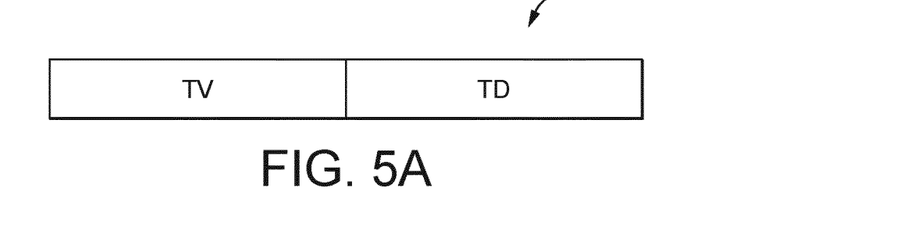
FIG. 5A shows a schematic representation of a driver intervention signal.

A schematic illustration of a driver intervention signal 540 according to an embodiment is illustrated in FIG. 5A. The driver intervention signal 540 comprises a torque component TV. The torque component TV is indicative of an amount of torque applied by the driver to the steering wheel 5. The torque component TV may comprise a value of the applied torque, for example as measured in Newton meters (Nm). The driver intervention signal 540 comprises a duration component TD indicative of a duration of the applied torque. The duration component TD may comprise a time value representing the amount of time for which the driver applies the torque, for example as measured in milliseconds (ms). The duration component TD need not comprise an explicit time value. Rather, the duration of the applied torque may be otherwise derivable from the driver intervention signal 540 for example from a duration of the driver intervention signal 540.

The control system 1 is configured to determine, in dependence on the received driver intervention signal 540, whether to implement an active driver override. The control system 1 is configured to implement an active driver override if the torque applied by the driver exceeds one or more driver intervention torque thresholds. In an embodiment, the control system 1 is configured to implement an active driver override if the torque component TV exceeds a torque value threshold and if the duration component TD exceeds an applied torque duration threshold.

The one or more driver intervention torque thresholds may be adjusted for different phases of the steering intervention. Advantageously, this adjustment enables the driver to more easily take back control during certain periods such as a latter phase of the steering intervention, whilst minimising the risk of an unintended override in an early, critical stage of the intervention.

Figure 5B:
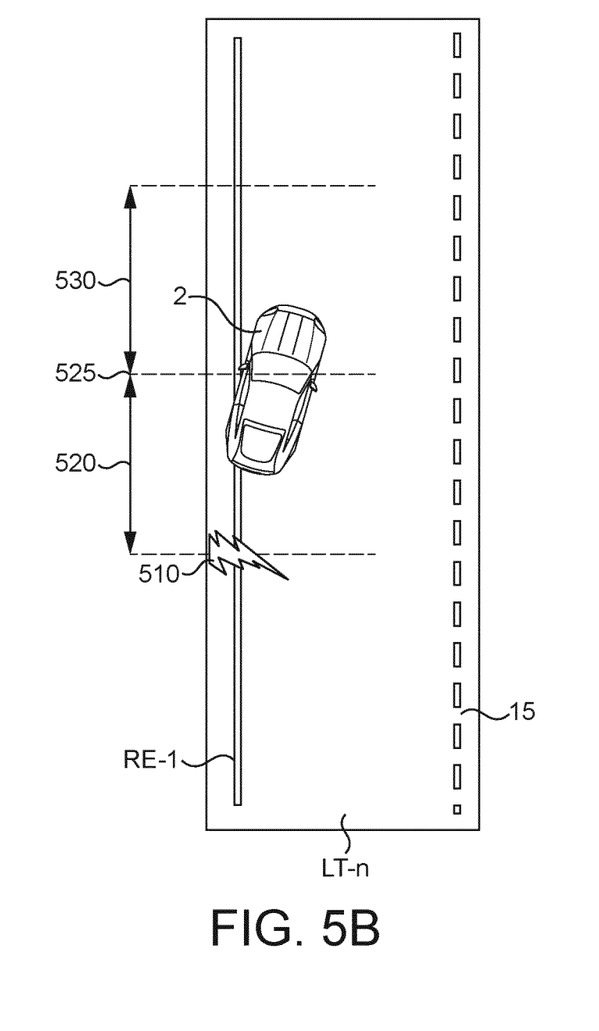
FIG. 5B illustrates phases of a steering intervention for the host vehicle.

FIG. 5B illustrates a steering intervention for a host vehicle split into two phases 520, 530, each phase being associated with a different driver intervention torque threshold. The host vehicle approaches the road edge RE-1 and at point 510, a steering intervention is triggered. The lane departure warning system 9 outputs the lane departure signal SLD. The control system 1 controls the power assist steering system 6 to generate the lane assist steering torque STQ-LD for maintaining the host vehicle 2 in the host-vehicle lane of travel LT-n.

During the first phase 520 of the steering intervention, a first torque value threshold and a first torque duration threshold are implemented. For the control system 1 to implement an active driver override during the first phase 520, the driver must apply a torque to the steering wheel in excess of the first torque value threshold for a duration exceeding the first torque duration threshold.

During the steering intervention, there is a transition 525 between the first phase 520 and the second phase 530. The transition 525 may be defined in some embodiments by the elapsed time since the steering intervention was triggered at point 510 reaching a threshold time. The threshold time in the illustrated embodiment is 500 ms, however it will be appreciated that any suitable threshold time may be implemented. In particular, the threshold time may be selected to allow sufficient time for the host vehicle 2 to be returned to the lane of travel LT-n, or for the lateral velocity of the host vehicle 2 to be directed towards the center of the lane of travel LT-n.

In other embodiments, the transition 525 may be defined as the interface between the inter-lane and intra-lane phases of the steering intervention. That is, the first phase 520 may align with the generation of the lane assist steering torque STQ-LD. The second phase 520 may align with the generation of the intra-lane steering torque STQ-LA.

During the second phase 530 of the steering intervention, a second torque value threshold and a second torque duration threshold are implemented. For the control system 1 to implement an active driver override during the second phase 530, the driver must apply a torque to the steering wheel in excess of the second torque value threshold for a duration exceeding the second torque duration threshold. The second torque value threshold may be reduced, i.e. less than, with respect to the first torque value threshold. The second torque duration threshold may be reduced i.e. shorter than with respect to the first torque duration threshold. Optionally, both the second torque value threshold and the second torque duration threshold may be reduced.

For example, the torque value threshold may be reduced from 3 Nm to 2 Nm, and the torque duration threshold may be reduced from 500 ms to 300 ms.

In this way, during the second phase 530 of the steering intervention the driver does not need to apply as high a torque to exceed the torque value threshold and implement an active driver override. Furthermore, the driver may not need to exceed the torque value threshold for as long a duration, meaning that the control system 1 will be more quickly responsive to a driver intervention in the second phase 530 of the steering intervention. This may be beneficial as the driver may wish to smoothly take back control before the vehicle is fully aligned, without wishing to apply any significant trajectory change to the vehicle. This may be particularly relevant on curved roads, where the steering intervention may be lengthy due to the final alignment and position conditions being difficult to meet. Furthermore, the driver may wish to align the host vehicle 2 differently within the lane LT-n on a curve.

In some embodiments, the steering intervention may comprise more than two phases. Each additional phase may be associated with an additional torque duration threshold and/or an additional torque value threshold. The torque duration threshold and/or the torque value threshold may be reduced for each subsequent phase of the steering intervention. For example, a third phase subsequent to the second phase 530 may be defined. Upon transitioning from the second phase 530 to the third phase in one example, the torque value threshold may be further reduced from 2 Nm to 1 Nm.

In alternative embodiments, the steering intervention may not be divided into phases 520, 530. Rather, the control system 1 may be configured to reduce the torque value threshold and/or the torque duration threshold in a continuous manner as the elapsed time since the steering intervention was triggered at point 510 increases. For example, one or both of the torque value threshold and the torque duration threshold may be determined to be inversely proportional to the elapsed time.

Figure 6:
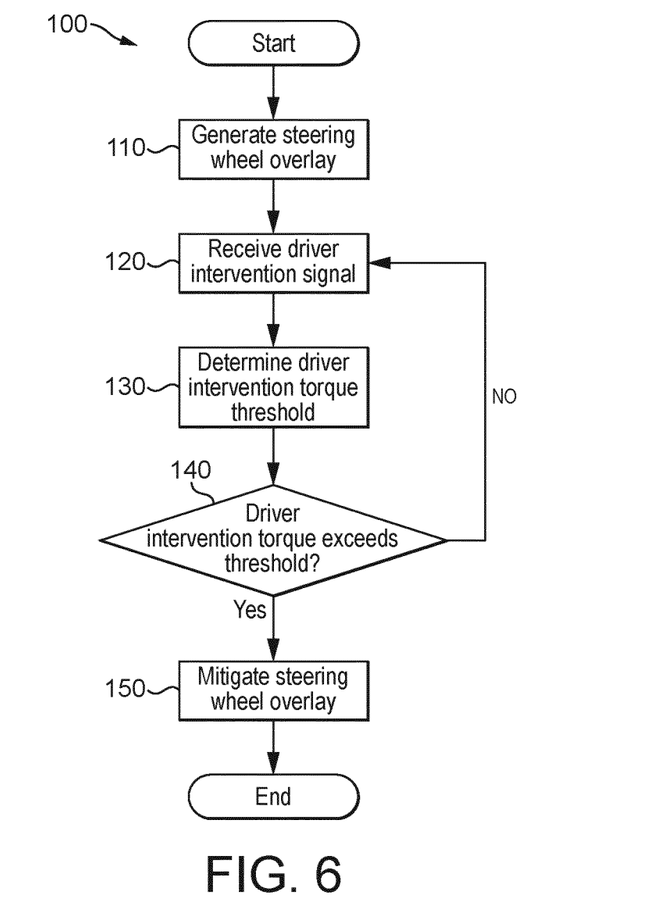
FIG. 6 shows a block diagram illustrating a method according to an embodiment of the present invention.

A method 100 representing operation of the control system 1 according to an embodiment of the invention is shown in FIG. 6. The method 100 will be described with reference to the steering intervention illustrated in FIG. 5.

At block 110 a steering wheel overlay signal is generated for steering the host vehicle toward a target lane position.

The steering wheel overlay signal is generated responsive to the lane departure warning system 9 outputting the lane departure signal SLD at point 510, as the host vehicle approaches the road edge RE-1. The steering wheel overlay signal controls the power assist steering system 6 to generate a lane assist steering torque STQ-LD or an intra-lane steering torque STQ-LA to steer the host vehicle towards a target lane position. The target lane position may be for example a mid-point of the lane of travel LT-n between the lane boundaries RE-1, 15.

At block 120, a driver intervention signal 540 indicative of a driver intervention torque applied to a steering wheel of the host vehicle is received by the control system 1. The driver intervention signal 540 comprises a torque component TV and a duration component TD as illustrated in FIG. 5A.

At block 130, the control system 1 is configured to determine a driver intervention torque threshold in dependence on one or more attributes of the steering wheel overlay signal. In particular embodiments, the control system 1 is configured to determine the driver intervention torque threshold in dependence on an elapsed time since the generation of the steering wheel overlay signal. The driver intervention torque threshold may be determined in dependence on the phase 520, 530 of the steering intervention. As discussed, the transition 525 may be defined as a threshold time from the start 510 of the steering intervention. Block 130 may then comprise determining whether the elapsed time exceeds the threshold time. If the threshold time is exceeded, the control system 1 is configured to reduce the driver intervention torque threshold from a first threshold to a second threshold. The reduction may apply to a torque value threshold, an applied torque duration threshold or both. In this way, the driver need apply a lesser torque for a lesser duration in order to implement an active driver override in the second phase 530 of the steering intervention compared to the first phase 520 of the steering intervention.

At block 140, the control system 1 is configured to determine whether the driver intervention torque applied to the steering wheel exceeds the driver intervention torque threshold determined in block 130. Block 140 may comprise determining whether the duration component TD exceeds the applied torque duration threshold and whether the torque component TV exceeds the torque value threshold. If the driver intervention torque applied by the driver exceeds the threshold(s) determined in block 130, then the control system determines an active driver override should be implemented and the method proceeds to block 150. If the driver intervention torque applied does not exceed the threshold, the steering intervention continues to proceed.

At block 150, the control system is configured to implement an active driver override by mitigating the steering wheel overlay signal. The steering wheel overlay signal may be mitigated by removing the steering wheel overlay signal, or reducing steering wheel overlay signal. The power assist steering system 6 is consequently controlled to remove or reduce the applied lane assist steering torque STQ-LD or the intra-lane steering torque STQ-LA. Thus, control of the vehicle trajectory may be transitioned back to the driver of the host vehicle 2 before the planned conclusion of the steering intervention.

The method 100 may be performed continuously throughout a steering intervention until an active driver override is successfully implemented in block 150 or until the steering intervention otherwise concludes due to the host vehicle 2 meeting another exit criteria. The other exit criteria may comprise the alignment or trajectory of the host vehicle 2 substantially matching a target alignment or trajectory and/ or or a lateral velocity of the host vehicle 2 being below a threshold, as has been described.

Figure 7:
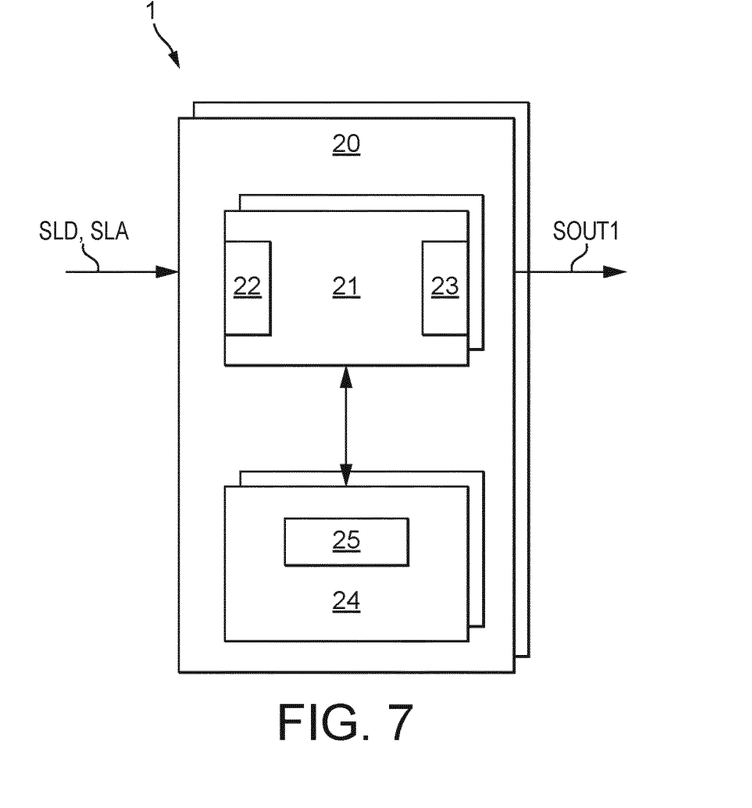
FIG. 7 is a schematic representation of the control system in accordance with an embodiment of the present invention.

With reference to FIG. 7, there is illustrated a simplified example of a control system 1 such as may be adapted to implement the method described herein. The control system 1 comprises one or more controllers 20 and is configured to control generation of a steering wheel overlay signal to control steering of a host vehicle 2. The control system 1 includes one or more controllers 20 and is configured to generate a steering wheel overlay signal for steering the host vehicle 2 toward a target lane position. The control system receives a driver intervention signal 540 indicative of a driver intervention torque applied to a steering wheel 5 of the host vehicle. The control system 1 determines a driver intervention torque threshold in dependence on an elapsed time since the generation of the steering wheel overlay signal. The control system 1 mitigates the steering wheel overlay signal in dependence on the driver intervention torque exceeding the driver intervention torque threshold.

It is to be understood that the or each controller 20 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 20 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 20 to implement the control techniques described herein (including some or all of the functionality required for the method described herein). The set of instructions could be embedded in said one or more electronic processors of the controller 20; or alternatively, the set of instructions could be provided as software to be executed in the controller 20. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 7, the or each controller 20 comprises at least one electronic processor 21 having one or more electrical input(s) 22 for receiving one or more input signals SLD, SLA, and one or more electrical output(s) 23 for outputting one or more output signals SOUT1. The or each controller 20 further comprises at least one memory device 24 electrically coupled to the at least one electronic processor 21 and having instructions 25 stored therein. The at least one electronic processor 21 is configured to access the at least one memory device 24 and execute the instructions 25 thereon.

The, or each, electronic processor 21 may comprise any suitable electronic processor (e.g., a microprocessor, a microcontroller, an ASIC, etc.) that is configured to execute electronic instructions. The, or each, electronic memory device 24 may comprise any suitable memory device and may store a variety of data, information, threshold value(s), lookup tables or other data structures, and/or instructions therein or thereon. In an embodiment, the memory device 24 has information and instructions for software, firmware, programs, algorithms, scripts, applications, etc. stored therein or thereon that may govern all or part of the methodology described herein. The processor, or each, electronic processor 21 may access the memory device 24 and execute and/or use that or those instructions and information to carry out or perform some or all of the functionality and methodology describe herein.

The at least one memory device 24 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 20 have been described comprising at least one electronic processor 21 configured to execute electronic instructions stored within at least one memory device 24, which when executed causes the electronic processor(s) 21 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for controlling generation of a steering wheel overlay signal to control positioning of a host vehicle, the control system comprising one or more controllers, the control system configured to:
   generate the steering wheel overlay signal for steering the host vehicle toward a target lane position;
   send the steering wheel overlay signal to a power assist steering system of the host vehicle, the steering wheel overlay signal instructing the power assist steering system to generate a steering torque;
   receive a driver intervention signal indicative of a driver intervention torque applied to a steering wheel of the host vehicle;
   determine a driver intervention torque threshold based at least in part on an elapsed time since generation of the steering wheel overlay signal;
   reduce the steering wheel overlay signal based at least in part on the driver intervention torque exceeding the driver intervention torque threshold; and
   send the reduced steering wheel overlay signal to the power assist steering system, the reduced steering wheel overlay signal instructing the power assist steering system to generate a reduced steering torque;
   wherein the steering wheel overlay signal comprises a lane assist steering overlay signal for steering the host vehicle to maintain the host vehicle within the lane of travel, and an intra-lane steering signal for steering the host vehicle toward the target lane position, and wherein the control system is configured to:
   apply the intra-lane steering signal after the lane assist steering overlay signal, and reduce the driver intervention torque threshold from a first threshold to a second threshold based at least in part on application of the intra-lane steering signal.

2. The control system as claimed in claim 1, wherein the driver intervention signal comprises a torque component indicative of an amount of torque applied, and a duration component indicative of a duration of the applied torque.

3. The control system as claimed in claim 2, wherein the driver intervention torque threshold comprises a torque value threshold and an applied torque duration threshold.

4. The control system as claimed in claim 1, wherein the control system is configured to determine the driver intervention torque threshold based at least in part on the elapsed time exceeding a threshold time.

5. The control system as claimed in claim 4, wherein the control system is configured to reduce the driver intervention torque threshold from a first threshold to a second threshold based at least in part on the elapsed time exceeding a threshold time.

6. The control system as claimed in claim 1, wherein the control system is further configured to:
determine at least one boundary of a lane of travel; and
determine the target lane position for the host vehicle in relation to the at least one boundary.

7. The control system as claimed in claim 6, wherein determining the or each boundary of the lane of travel comprises identifying a road marking or a road edge.

8. The control system as claimed in claim 6, wherein the control system is configured to control generation of the steering wheel overlay signal to maintain the host vehicle at a predetermined distance from the at least one boundary.

9. A vehicle comprising the control system as claimed in claim 1.

10. The control system as claimed in claim 1, wherein the control system is further configured to:
determine a first boundary and a second boundary of the lane of travel, wherein the first boundary and the second boundary are opposing; and
control generation of the steering wheel overlay signal to steer the host vehicle towards a mid-point between the first boundary and second boundary.

11. A computer-implemented method for controlling generation of a steering wheel overlay signal to control positioning of a host vehicle, the computer-implemented method comprising:
generating the steering wheel overlay signal for steering the host vehicle toward a target lane position;
sending the steering wheel overlay signal to a power assist steering system of the host vehicle, the steering wheel overlay signal instructing the power assist steering system to generate a steering torque;
receiving a driver intervention signal indicative of a driver intervention torque applied to a steering wheel of the host vehicle;
determining a driver intervention torque threshold based at least in part on an elapsed time since generation of the steering wheel overlay signal;
reducing the steering wheel overlay signal based at least in part on the driver intervention torque exceeding the driver intervention torque threshold; and
sending the reduced steering wheel overlay signal to a power assist steering system, the reduced steering wheel overlay signal instructing the power assist steering system to generate a reduced steering torque;
wherein the steering wheel overlay signal comprises a lane assist steering overlay for maintaining the host vehicle within the lane of travel, and an intra-lane steering signal for steering the host vehicle toward the target lane position, and wherein the computer-implemented method further comprises:
applying the intra-lane steering signal after the lane assist steering overlay; and
reducing the driver intervention torque threshold from a first threshold to a second threshold based at least in part on application of the intra-lane steering signal.

12. A non-transitory computer-readable medium having a set of instructions stored therein which, when executed, cause a processor to perform the computer-implemented method according to claim 11.

13. Computer software that, when executed, is arranged to perform the computer-implemented method according to claim 11.

14. The computer-implemented method as claimed in claim 11, wherein the driver intervention signal comprises a torque component indicative of an amount of torque applied, and a duration component indicative of a duration of the applied torque.

15. The computer-implemented method as claimed in claim 14, wherein the driver intervention torque threshold comprises a torque value threshold and an applied torque duration threshold.

16. The computer-implemented method as claimed in claim 11, comprising determining the driver intervention torque threshold based at least in part on the elapsed time exceeding a threshold time.

17. The computer-implemented method as claimed in claim 16, comprising reducing the driver intervention torque threshold from a first threshold to a second threshold based at least in part on the elapsed time exceeding a threshold time.

18. The computer-implemented method as claimed in claim 11, further comprising:
determining at least one boundary of a lane of travel; and
determining the target lane position for the host vehicle in relation to the at least one boundary.

19. The computer-implemented method as claimed in claim 18, further comprising:
controlling generation of the steering wheel overlay signal to steer the host vehicle towards at a predetermined distance from a first boundary.

20. The computer-implemented method as claimed in claim 18, further comprising:
determining a first boundary and a second boundary of the lane of travel, wherein the first boundary and the second boundary are opposing; and
controlling generation of the steering wheel overlay signal to steer the host vehicle towards a mid-point between the first boundary and second boundary.

* * * * *